(12) United States Patent
Kim et al.

(10) Patent No.: US 9,105,925 B2
(45) Date of Patent: Aug. 11, 2015

(54) ANODE ACTIVE MATERIAL COMPRISING A POROUS TRANSITION METAL OXIDE, ANODE COMPRISING THE ANODE ACTIVE MATERIAL, LITHIUM BATTERY COMPRISING THE ANODE, AND METHOD OF PREPARING THE ANODE ACTIVE MATERIAL

(75) Inventors: Han-su Kim, Seoul (KR); Chan-ho Pak, Seoul (KR); Ji-man Kim, Suwon-si (KR); Jeong-kuk Sohn, Cheonan-si (KR); Soo-sung Kong, Gimje-si (KR)

(73) Assignee: SAMSUNG ELECTRONICS CO., LTD., Yeongtong-Gu (KR)

( * ) Notice: Subject to any disclaimer, the term of this patent is extended or adjusted under 35 U.S.C. 154(b) by 748 days.

(21) Appl. No.: 12/613,719

(22) Filed: Nov. 6, 2009

(65) Prior Publication Data

US 2010/0119944 A1    May 13, 2010

(30) Foreign Application Priority Data

Nov. 10, 2008    (KR) .................. 10-2008-0111220
Oct. 21, 2009    (KR) .................. 10-2009-0100310

(51) Int. Cl.
| | |
|---|---|
| H01M 4/48 | (2010.01) |
| H01M 4/139 | (2010.01) |
| H01M 10/0525 | (2010.01) |
| H01M 4/485 | (2010.01) |
| H01M 4/04 | (2006.01) |
| H01M 4/1391 | (2010.01) |
| H01M 10/04 | (2006.01) |

(52) U.S. Cl.
CPC ............ *H01M 4/485* (2013.01); *H01M 4/0416* (2013.01); *H01M 4/0471* (2013.01); *H01M 4/0492* (2013.01); *H01M 4/1391* (2013.01); *H01M 10/0427* (2013.01); *H01M 10/0525* (2013.01); *Y02E 60/122* (2013.01)

(58) Field of Classification Search
CPC ............ H01M 4/0416; H01M 4/0471; H01M 4/0492; H01M 4/485; H01M 4/1391; H01M 10/0427; H01M 10/0525
USPC ....................................... 429/231.5
See application file for complete search history.

(56) References Cited

U.S. PATENT DOCUMENTS

| | | | |
|---|---|---|---|
| 5,621,609 A | 4/1997 | Zheng et al. .................. 361/503 |
| 6,103,416 A * | 8/2000 | Bauerlein et al. .............. 429/127 |
| 2003/0175583 A1* | 9/2003 | Suzuki ........................... 429/57 |

FOREIGN PATENT DOCUMENTS

| | | |
|---|---|---|
| JP | 07-161382 | 6/1995 |
| JP | 11-260363 A | 9/1999 |
| JP | 2000-100430 A | 4/2000 |
| JP | 2001-233674 A | 8/2001 |

(Continued)

OTHER PUBLICATIONS

Akimoto et al., Machine translation of JP 2008-117625 A, May 2008.*

(Continued)

*Primary Examiner* — Sean P Cullen
(74) *Attorney, Agent, or Firm* — Stein IP, LLC

(57) ABSTRACT

An anode active material including a porous transition metal oxide; an anode including the anode active material; a lithium battery including the anode; and a method of preparing the anode active material.

23 Claims, 7 Drawing Sheets

(56) References Cited

FOREIGN PATENT DOCUMENTS

| | | | |
|---|---|---|---|
| JP | 2006-100244 | | 4/2006 |
| JP | 2006-100244 A | | 4/2006 |
| JP | 2008-16792 A | | 1/2008 |
| JP | 2008117625 A | * | 5/2008 |
| JP | 2008-531447 A | | 8/2008 |
| WO | WO 99/00536 | | 1/1999 |
| WO | WO 99/59218 | | 11/1999 |
| WO | WO 03/015196 A2 | | 2/2003 |
| WO | WO 2005/101548 | | 10/2005 |
| WO | WO 2005/101548 A1 | | 10/2005 |
| WO | WO 2008073968 A2 | * | 6/2008 |

OTHER PUBLICATIONS

Rossinyol et al. Nanostructured metal oxides synthesized by hard template method for gas sensing applications, Apr. 2005, Sensors and Actuators B, 109, 57-63.*

Yue et al., Mesoporous Monocrystalline TiO2 and Its Solid-State Electrochemical Properties, Apr. 6, 2009, Chemistry of Materials, 21, 2540-2546.*

Shi et al., Ordered Mesoporous Metallic MoO2 Materials with Highly Reversible Lithium Storage Capacity, Sep. 23, 2009, Nano Letters, 9, 4215-4220.*

European Search Report dated Mar. 11, 2010, issued in corresponding European Patent Application No. 09175310.3.

Auborn, J. J. and Barberio, Y.L., Lithium Intercalation Cells Without Metallic Lithium, J. Electrochem. Soc. (Mar. 1987).

Japanese Patent Office Action issued Dec. 3, 2013, in corresponding Japanese Patent Application No. 2009-257084.

L.C. Yang et al., "MoO2 synthesized by reduction of MoO3 with ethanol vapor as an anode material with good rate capability for the lithium ion battery", Sep. 28, 2007, pp. 357-360.

Japanese Office Action dated Sep. 16, 2014, issued to Japanese Application No. 2009-257084.

* cited by examiner

ANODE ACTIVE MATERIAL COMPRISING A POROUS TRANSITION METAL OXIDE, ANODE COMPRISING THE ANODE ACTIVE MATERIAL, LITHIUM BATTERY COMPRISING THE ANODE, AND METHOD OF PREPARING THE ANODE ACTIVE MATERIAL

CROSS-REFERENCE TO RELATED APPLICATIONS

This application claims the benefit of Korean Patent Application No. 10-2008-0111220, filed on Nov. 10, 2008, in the Korean Intellectual Property Office, and Korean Patent Application No. 10-2009-0100310, filed on Oct. 21, 2009, in the Korean Intellectual Property Office, the disclosures of which are incorporated herein, by reference.

BACKGROUND

1. Field

One or more embodiments of the present teachings relate to an anode active material, an anode including the anode active material, a lithium battery including the anode, and a method of preparing the anode active material.

2. Description of the Related Art

Carbonous materials such as graphite are representative examples of anode active materials for lithium batteries. Graphite has excellent electrical capacity retention characteristics and excellent voltage characteristics. In addition, graphite does not vary in volume when used to form an alloy with lithium, and thus, can increase the stability of a battery.

In addition, metals that can form alloys with lithium can be used as anode active materials for lithium batteries. Examples of metals that can form alloys with lithium include Si, Sn, Al, and the like. Such metals have very high electrical capacities, but experience a change in volume during charging and discharging, thereby electrically isolating the active material within the electrode. In addition, the decomposition reaction of electrolytes becomes severe, due to an increase in specific surface area of the active material.

Thus, there is an increasing demand for the development of a higher performance anode active material for high-capacitance batteries.

SUMMARY

One or more embodiments include an anode active material including a transition metal oxide having a novel structure.

One or more embodiments include an anode including the anode active material.

One or more embodiments include a lithium battery employing the anode.

One or more embodiments include a method of preparing the anode active material.

To achieve the above and/or other aspects, one or more embodiments may include an anode active material comprising a porous transition metal oxide, wherein the porous transition metal oxide comprises an oxide of at least one transition metal selected from the group consisting of molybdenum (Mo), titanium (Ti), vanadium (V), and tungsten (W).

To achieve the above and/or other aspects, one or more embodiments may include an anode including the anode active material.

To achieve the above and/or other aspects, one or more embodiments may include a lithium battery including the anode.

To achieve the above and/or other aspects, one or more embodiments may include a method of preparing the anode active material, the method including: impregnating a porous compound with a solution containing a transition metal salt; calcinating the porous compound impregnated with the solution in a reducing atmosphere; and etching the calcinated product using an etching solution.

Additional aspects and/or advantages of the present teachings will be set forth in part in the description which follows and, in part, will be obvious from the description, or may be learned by practice of the present teachings.

BRIEF DESCRIPTION OF THE DRAWINGS

These and/or other aspects and advantages of the present teachings will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
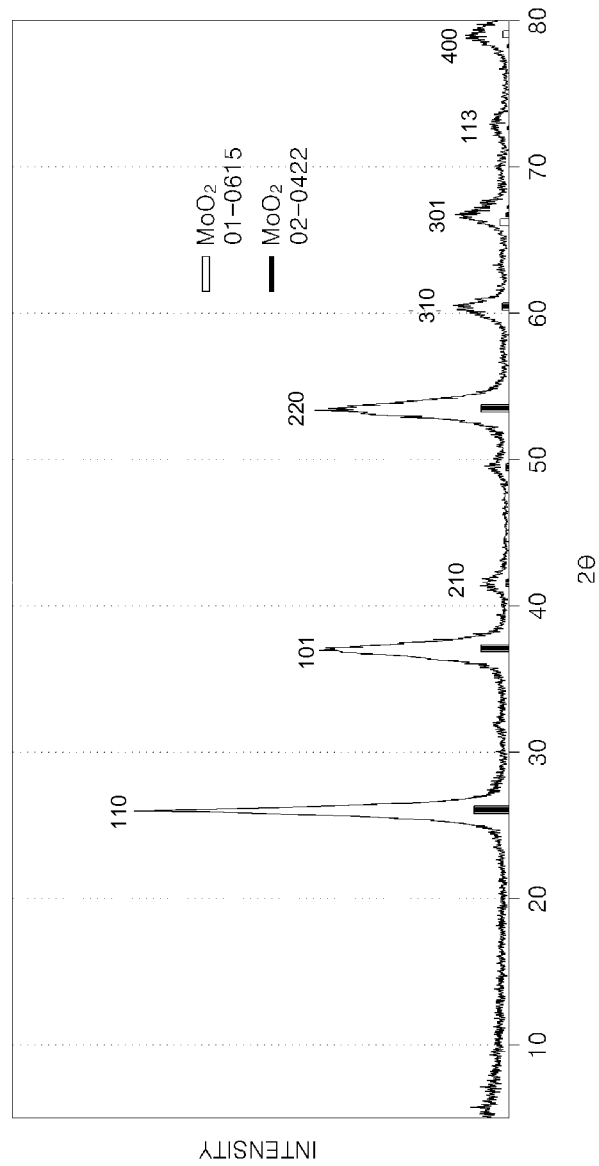
FIGS. 1 and 2 are graphs showing the results of an X-ray diffraction (XRD) test on an anode active material prepared according to Example 1.

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures. In this regard, the exemplary embodiments may have different forms and should not be construed as being limited to the descriptions set forth herein. Hereinafter, an anode active material, an anode including the anode active material, a lithium battery employing the anode, and a method of preparing the anode active material, according to exemplary embodiments of the inventive concept, will be described in detail.

One or more exemplary embodiments include an anode active material including a porous transition metal oxide. The porous transition metal oxide includes an oxide of at least one transition metal selected from the group consisting of molybdenum (Mo), titanium (Ti), vanadium (V), and tungsten (W).

The porous transition metal oxide includes a large number of nanoscale pores, and thus, has a larger contact area with an electrolyte, thereby increasing the electrical capacity per unit mass of the anode active material. In addition, a travel path for electrons to migrate from the anode active material toward the electrolyte, and a travel path for lithium ions, are reduced, thereby increasing the rate of reactions in the anode.

The porous transition metal oxide may have a porosity of about 80% or less. For example, the porous transition metal oxide may have a porosity of from about 20% to about 70%. In this case, the porosity refers to a ratio of the volume of pores to the total volume of the porous transition metal oxide.

The porous transition metal oxide may have a discharge capacity of at least about 1000 mAh/g, per unit weight. The porous transition metal oxide may have a discharge capacity of at least about 1000 mAh/cc, per unit volume.

The porous transition metal oxide may have pores of various shapes. The pores may have an average diameter of from about 2 nm to about 50 nm, if the pores are circular. For example, the porous transition metal oxide may have a pore diameter of from about 3 to about 30 nm, a pore diameter of from about 3 to about 15 nm, or a pore diameter of from about 3 to about 10 nm. When the porous transition metal oxide has a pore diameter within the above range, a lithium battery including the anode active material may have an improved discharge capacity.

The pores of the porous transition metal oxides may be in the form of interconnected channels. The channels facilitate electrolyte permeation into the transition metal oxide and the migration of lithium ions. The pores may be disposed in a matrix and extend parallel to one another.

The pores of the porous metal oxide may be arranged in a regular pattern. The regular arrangement of the pores ensures consistent electrochemical reactions, and thus, prevents the localized loss of, or damage to, the anode active material.

Figure 4A:
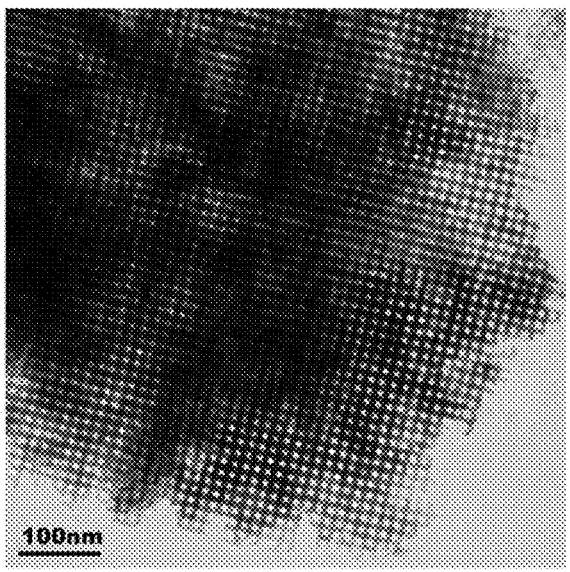
FIGS. 4A through 4D are transmission electron microscopic (TEM) images of the anode active material prepared according to Example 1.
Figure 4B:
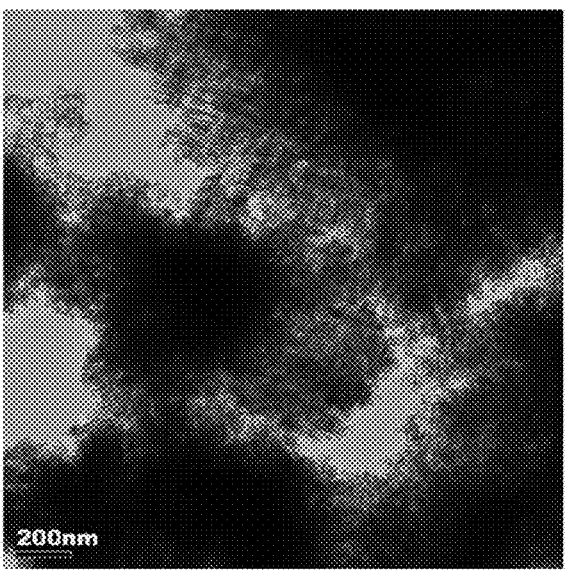
Figure 4C:
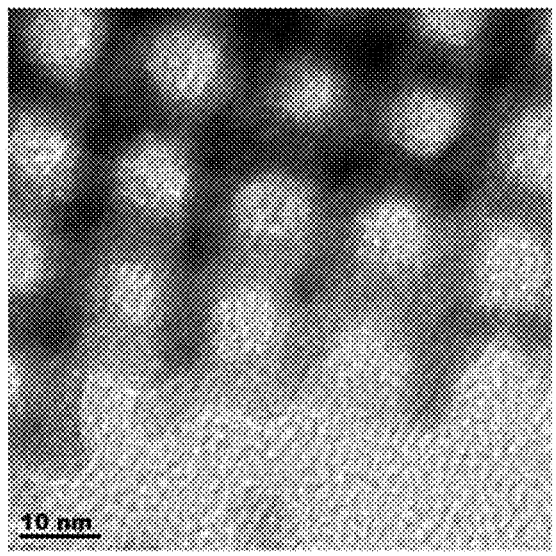
Figure 4D:
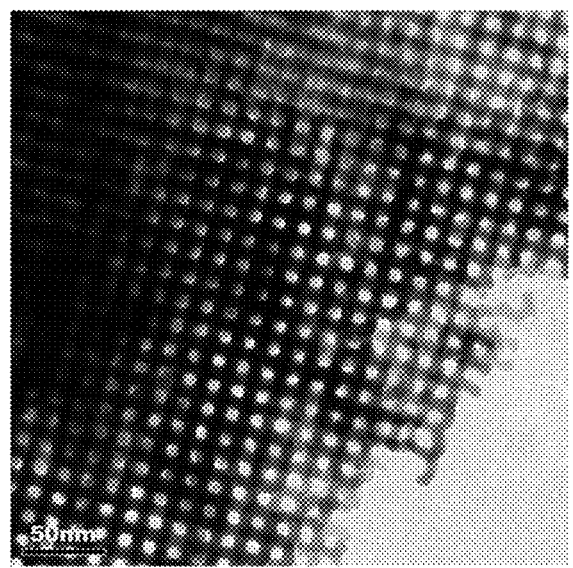

The porous transition metal oxide may have a uniform pore diameter of from about 3 to about 10 nm. In addition, a framework, formed by the walls of the pores, may be formed in a regular pattern. The wall thickness (thickness of the transition metal oxide framework between adjacent pores) may be of from about 5 to about 10 nm. When the porous transition metal oxide has a pore diameter and a wall thickness within the above ranges, the discharge capacity of a lithium battery including the anode active material may be further improved. For example, the framework, i.e., the walls of pores, appear in black in FIG. 4C, and the wall thickness corresponds to the thickness of the black areas in FIG. 4C, i.e., the distance between adjacent pores. The pores correspond to the empty spaces in the framework in FIG. 4C, and thus, the pore diameter corresponds to diameters of the spaces in FIG. 4C.

The pores of the porous transition metal oxide may have a specific surface area of about 50 to about 250 m²/g, about 80 to about 220 m²/g, or about 100 to about 110 m²/g, for example. In addition, a total volume of pores per unit weight of the porous transition metal oxide may be, for example, less than about 2 cc/g, about 0.1 to about 1 cc/g, or about 0.3 to about 0.6 cc/g. When the pores of the porous transition metal oxide have a specific surface area and/or a total volume within the above ranges, the discharge capacity of a lithium battery including the anode active material is further improved.

The transition metal oxide of the anode active material may be represented by Formula 1 below:

  <Formula 1> wherein M is selected from among molybdenum (Mo), titanium (Ti), tungsten (W), vanadium (V), and a mixture thereof, $1 \leq x \leq 2$, $1 \leq y \leq 8$, and $2 \leq x+y \leq 10$.

The transition metal oxide of the anode active material may include $MoO_2$, $TiO_2$, or a mixture thereof, for example.

One or more exemplary embodiments include an anode including the anode active material. For example, the anode may be manufactured by molding an anode active material composition, including the anode active material and a binder, into a desired shape, or coating the anode material on a current collector such as copper foil, or the like.

In particular, the anode active material composition is prepared, and then may be directly coated on a copper foil current collector, to obtain an anode plate. Alternatively, the anode active material composition may be cast on a separate support, and then an anode active material film is separated from the support and laminated on the copper foil current collector, to obtain an anode plate. The anode and/or methods of formation thereof, are not limited to the examples described above, and may be one of a variety of types.

High capacity batteries store and discharge a large amount of current, and thus, a material having a low electric resistance is generally used therein. Any kind of conducting agent that reduces the resistance of an electrode may be added to the anode. In this regard, the conducting agent may be carbon black, graphite particulates, or the like. Alternatively, the anode active material composition may be printed on a flexible electrode substrate, to manufacture a printed battery.

One or more exemplary embodiments include a lithium battery employing the anode including the anode active material. The lithium battery may be manufactured in the following manner.

First, a cathode active material, a conducting agent, a binder, and a solvent are mixed to prepare a cathode active material composition. The cathode active material composition is directly coated on a metallic current collector and then dried, to prepare a cathode plate. Alternatively, the cathode active material composition may be cast on a separate support, and then a cathode active material film separated is from the support and laminated on a metallic current collector, to prepare a cathode plate.

Any suitable lithium-containing metal oxide may be used as the cathode active material. Examples of the lithium-containing metal oxide include $LiCoO_2$, $LiMn_xO_{2x}$ where x=1 or 2, $LiNi_{1-x}Mn_xO_2$ where $0<x<1$, or $LiNi_{1-x-y}Co_xMn_yO_2$ where $0 \leq x \leq 0.5$ and $0 \leq y \leq 0.5$. Specific examples of the lithium-containing metal oxide include compounds capable of intercalation and deintercalation of lithium ions, such as $LiMn_2O_4$, $LiCoO_2$, $LiNiO_2$, $LiFeO_2$, $V_2O_5$, TiS, MoS, or the like. The conducting agent may be carbon black or graphite particulate. Examples of the binder include a vinylidene fluoride/hexafluoropropylene copolymer, polyvinylidene fluoride (PVDF), polyacrylonitrile, polymethylmethacrylate, polytetrafluoroethylene, mixtures of these materials, and a styrene butadiene rubber polymer. The solvent may be N-methylpyrrolidone, acetone, water, or the like. Amounts of the cathode electrode active material, the conducting agent, the binder, and the solvent are amounts generally used in the art.

A separator used in the lithium battery may be any suitable separator. The separator may have a low resistance to the migration of ions in an electrolyte and an excellent electrolyte-retaining ability. Examples of the separator include glass fiber, polyester, polyethylene, polypropylene, polytetrafluoroethylene (PTFE), and a combination thereof. The separator may be in a non-woven or a woven fabric form. In particular, a windable separator including polyethylene, polypropylene, or the like can be used. A separator that can retain a large amount of an organic electrolytic solution may be used, for example. These separators may be manufactured according to the following method.

A polymer resin, a filler, and a solvent are mixed to prepare a separator composition. The separator composition is directly coated on an electrode and then dried, to form a separator film. Alternately, the separator composition can be cast onto a separate support, dried, detached from the separate support, and then laminated on an upper portion of the electrode, thereby forming a separator film.

Any suitable polymer resin used for binding electrode plates in lithium batteries can be used. Examples of the polymer resin include a vinylidenefluoride/hexafluoropropylene copolymer, polyvinylidene fluoride (PVDF), polyacrylonitrile, polymethylmethacrylate, and a mixture thereof.

Next, an electrolyte is prepared. The electrolyte may be an organic electrolytic solution. Alternatively, the electrolyte may be in the form of a gel or a solid. The organic electrolytic solution may be prepared by dissolving a salt in a solvent. The solvent can be selected from the group consisting of propylene carbonate, ethylene carbonate, fluoroethylene carbonate, diethyl carbonate, methylethyl carbonate, methylpropyl carbonate, butylene carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, dimethyl carbonate, methylisopropyl carbonate, ethylpropyl carbonate, dipropyl carbonate, dibutyl carbonate, diethylene glycol, dimethyl ether, and a mixture thereof. The salt may be a lithium salt, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are independently a natural number, LiCl, LiI, or a mixture thereof.

Figure 6:
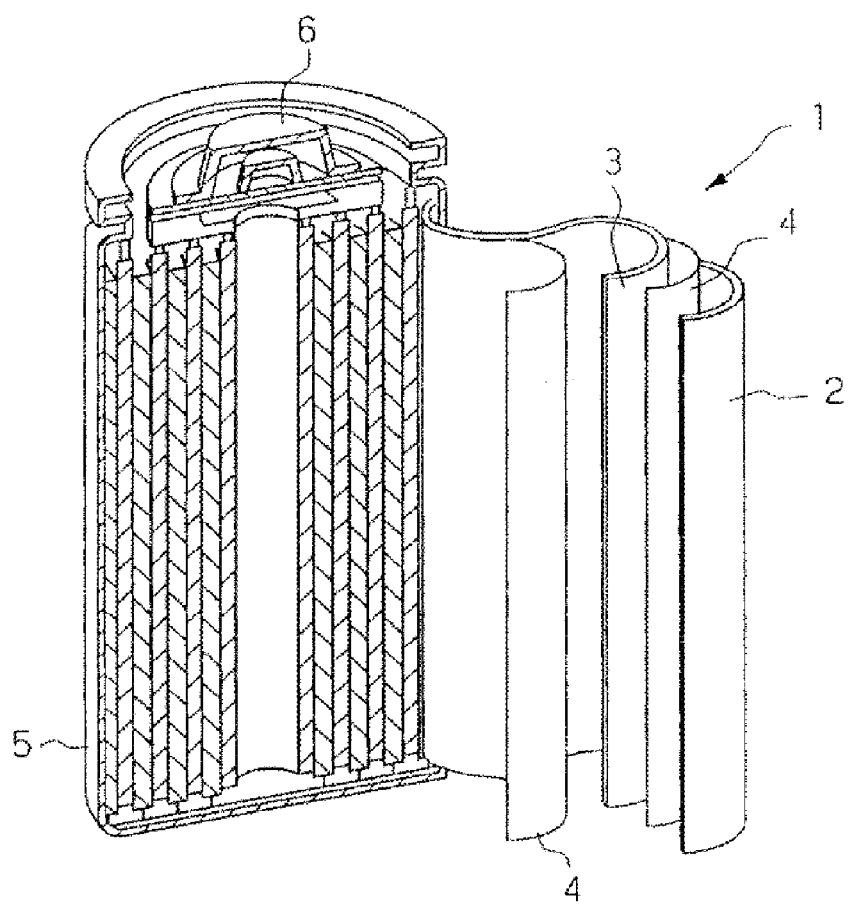
FIG. 6 is a schematic view of a lithium battery according to an exemplary embodiment.

FIG. 6 is a schematic view of a lithium battery 1 according to an embodiment. Referring to FIG. 6 the lithium battery 1 includes a cathode 3, an anode 2 and a separator 4. The cathode 3, the anode 2 and the separator 4 are wound or folded and then accommodated in a battery case 5. The battery case 5 is injected with an organic electrolytic solution and then sealed with a cap assembly 6, to complete the manufacture of the lithium battery 1. The battery case 5 may have a cylindrical, rectangular, or pouch-type. The lithium battery 1 may be a lithium ion battery.

According to some aspects, the separator 4 is interposed between the cathode 3 and the anode 2 to form a battery assembly. The battery assembly is stacked in a bi-cell structure and impregnated with the organic electrolytic solution. The resultant is put into a pouch and hermetically sealed, thereby completing the manufacture of a lithium ion polymer battery.

Alternatively, a plurality of battery assemblies may be stacked to form a battery pack. The battery pack may be used as an electric vehicle battery, which operates at high temperatures and has a high output. The battery pack may also be in the form of a large area thin-film type battery.

The lithium battery 1 may have a discharge capacity of at least about 1000 mAh/g, per unit weight of the anode active material. The lithium battery 1 may have a discharge capacity of at least about 1000 mAh/cc, per unit volume of the anode active material.

One or more exemplary embodiments include a method of preparing an anode active material, the method including: impregnating a porous compound with a solution containing a salt of a transition metal; calcining the porous compound impregnated with the solution in a reducing atmosphere; and etching the calcined product using an etching solution.

In the method of preparing an anode active material, the porous compound may be selected from the group consisting of silica ($SiO_2$), $Al_2O_3$, ZnO, MgO, and a mixture of these compounds. The porous compound operates as a template for preparing a porous transition metal compound. The porous compound is impregnated with the solution containing a transition metal salt, until the pores are filled, and then the porous compound impregnated with the solution is calcinated, to obtain a composite of the porous compound and a transition metal compound. Then, the porous compound is removed from the composite using an etching solution, so that the porous transition metal compound is obtained.

In the method of preparing an anode active material, the transition metal salt may be selected from the group consisting of $MoCl_5$, aluminum molybdate, and a mixture of these salts. These salts may be used after being dissolved in a solution.

In the method of preparing an anode active material, the calcinating of the porous compound may be performed at a temperature of about 400° C. to about 600° C. When the porous compound is calcinated within this temperature range, an anode active material having nanoscale pores may be prepared. The reducing atmosphere for the calcination may contain at least one gas selected from the group consisting of nitrogen, argon, helium, and hydrogen.

In the method of preparing an anode active material, the etching solution may be selected from the group consisting of a hydrofluoric acid (HF) solution, a sodium hydroxide (NaOH) solution, and a HF—$NH_4F$ buffer solution. The etching solution may be an acid or a base.

The method of preparing an anode active material may further include thermally treating the etched product in a reducing atmosphere, after the etching. The adhesive properties of the anode active material may be improved, due to this additional thermal treatment. For example, the adhesion of the anode active material to the current collector may be improved.

The additional thermal treatment may be performed at a temperature of about 100° C. to about 600° C., or about 200° C. to about 500° C. The reducing atmosphere for the additional treatment may contain at least one gas selected from the group consisting of nitrogen, argon, helium, and hydrogen.

The present inventive concept will be described in further detail, with reference to the following examples. These examples are for illustrative purposes only and are not intended to limit the scope of the present inventive concept.

Preparation of Anode Active Material

Example 1

A solution of ammonium molybdate dissolved in 1 g of ethanol was injected into porous silicon dioxide $SiO_2$(KIT-6) having gyroid pore structure. The solution of ammonium molybdate in ethanol was injected into the $SiO_2$ in a ratio of 20 parts by weight of ammonium molybdate, based on 100 parts by weight of $SiO_2$. Then, the porous $SiO_2$ into which ammonium molybdate was injected was calcined at 500° C. in a reducing atmosphere (100% hydrogen gas atmosphere), for 4 hours, to obtain a $SiO_2$—$MoO_2$ composite. The composite was put into a 1M-HF solution and reacted for 2 hours. The $SiO_2$ template was removed from the reaction product to obtain porous $MoO_2$.

Example 2

An anode active material was prepared in the same manner as in Example 1, except that the porous $MoO_2$ from which the $SiO_2$ template was removed was additionally thermally treated at 100° C. in a hydrogen atmosphere, for 2 hours.

Example 3

An anode active material was prepared in the same manner as in Example 1, except that the porous $MoO_2$ from which the $SiO_2$ template was removed was additionally thermally treated at 200° C. in a hydrogen atmosphere, for 2 hours.

Example 4

An anode active material was prepared in the same manner as in Example 1, except that the porous $MoO_2$ from which the $SiO_2$ template was removed was additionally thermally treated at 300° C. in a hydrogen atmosphere, for 2 hours.

Example 5

An anode active material was prepared in the same manner as in Example 1, except that the porous $MoO_2$ from which the $SiO_2$ template was removed was additionally thermally treated at 400° C. in a hydrogen atmosphere, for 2 hours.

Example 6

An anode active material was prepared in the same manner as in Example 1, except that the porous $MoO_2$ from which the $SiO_2$ template was removed was additionally thermally treated at 500° C. in a hydrogen atmosphere, for 2 hours.

Example 7

A solution of titanium chloride dissolved in 1 g of methanol was injected into porous $SiO_2$ (KIT-6). The solution of titanium chloride in methanol was injected into the $SiO_2$, at a ratio of 20 parts by weight of titanium chloride, based on 100 parts by weight of $SiO_2$. Then, the porous $SiO_2$, into which titanium chloride was injected, was calcined at 500° C. in a reducing atmosphere (100% hydrogen gas atmosphere), for 4 hours, to obtain a $SiO_2$—$TiO_2$ composite. The composite was put into a 1M-HF solution and reacted for 2 hours. The $SiO_2$ template was removed from the reaction product to obtain porous $TiO_2$.

Comparative Example 1

Bulk, non-porous, $MoO_2$ was used as an anode active material.

Manufacture of Anode and Lithium Battery

Example 8

70 mg of the anode active material prepared in Example 1 (in a particle form), 15 mg of a carbon conducting agent (Super P), 15 mg of polyvinylidene fluoride (PVDF), and 15 ml of N-methylpyrrolidone (NMP) were mixed in an agate mortar to prepare a slurry. The slurry was coated on a Cu current collector to a thickness of about 50 μm, using a doctor blade. Then, the resultant was dried at room temperature for 2 hours, and then dried again at 120° C. in a vacuum, for 2 hours, to manufacture an anode plate.

The anode plate, a lithium metal as a counter electrode, a polypropylene layer (Cellgard 3510) as a separator, and an electrolytic solution obtained by dissolving 1.3 M of $LiPF_6$ in a mixed solvent of ethylene carbonate (EC) and diethylene carbonate (DEC) (volume ratio of 3:7), were used to manufacture a CR-2016 standard coin cell.

Example 9

A coin cell was manufactured in the same manner as in Example 8, except that the anode was manufactured using the anode active material of Example 2, instead of the anode active material of Example 1.

Example 10

A coin cell was manufactured in the same manner as in Example 8, except that the anode was manufactured using the anode active material of Example 3, instead of the anode active material of Example 1.

Example 11

A coin cell was manufactured in the same manner as in Example 8, except that the anode was manufactured using the anode active material of Example 4, instead of the anode active material of Example 1.

Example 12

A coin cell was manufactured in the same manner as in Example 8, except that the anode was manufactured using the anode active material of Example 5, instead of the anode active material of Example 1.

Example 13

A coin cell was manufactured in the same manner as in Example 8, except that the anode was manufactured using the anode active material of Example 6, instead of the anode active material of Example 1.

Example 14

A coin cell was manufactured in the same manner as in Example 8, except that the anode was manufactured using the anode active material of Example 7, instead of the anode active material of Example 1.

Comparative Example 2

A coin cell was manufactured in the same manner as in Example 8, except that the anode was manufactured using the anode active material of Comparative Example 1, instead of the anode active material of Example 1.

Evaluation Example 1

X-Ray Diffraction Test

The X-ray diffraction characteristics of the anode active material prepared according to Example 1 were measured. The results are shown in FIGS. 1 and 2.

Figure 2:
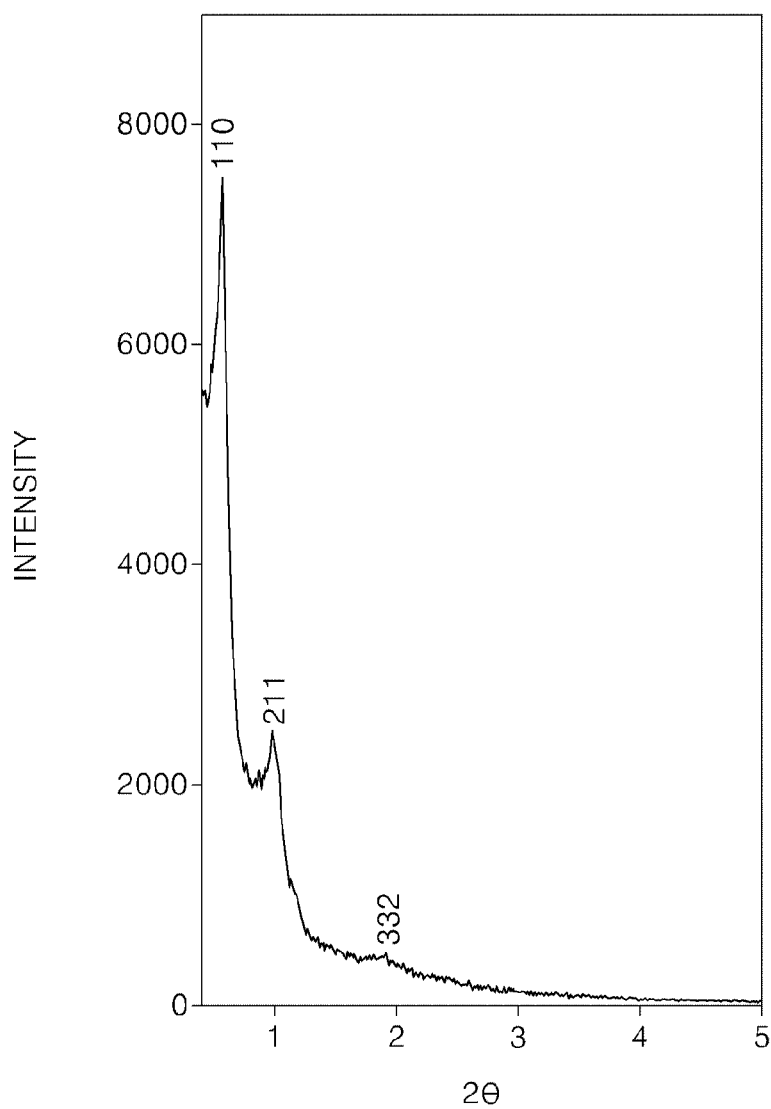

As shown in FIGS. 1 and 2, it is confirmed that porous $MoO_2$, having pores of a regular nanoscale diameter of about 5~7 nm, was synthesized in Example 1. FIG. 1 shows that the synthesized Mo oxide was in the form of $MoO_2$. In addition, the results of the X-ray diffraction test in FIG. 2, showing a small-angle diffraction pattern, confirm that porous $MoO_2$, having uniform nanoscale pores arranged in a regular pattern, was synthesized. The two kinds of $MoO_2$ denoted in FIG. 1 are common forms of $MoO_2$, which were used as references for the analysis of the X-ray diffraction pattern of the $MoO_2$ of Example 1.

Evaluation Example 2

Nitrogen Adsorption Test

Figure 3:
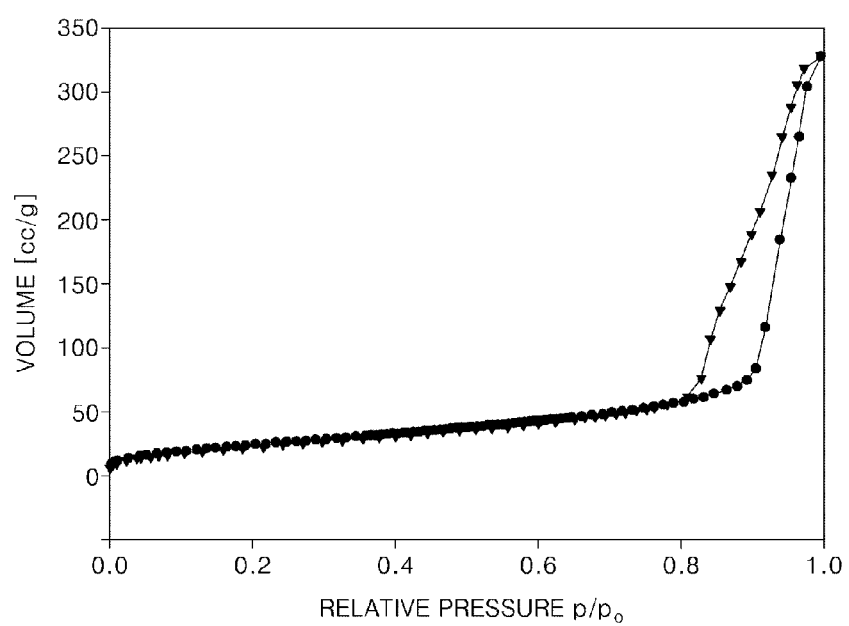
FIG. 3 is a graph showing the results of a nitrogen adsorption test performed on the anode active material prepared according to Example 1

Nitrogen adsorption/desorption characteristics of the anode active material in particle form prepared according to Example 1 were measured, and the measurement results are shown in FIG. 3. In the nitrogen adsorption curve, the specific surface area of the anode active material is calculated using $P/P_0$ value data between 0.15 and 0.3, through the BET (Brunauer-Emmett-Teller) method. Further, in the nitrogen adsorption curve, the total volume of pores of the anode active material is represent by a liquid nitrogen volume calculated from an amount of adsorbed nitrogen, at a $P/P_0$ value of 0.99.

As shown in FIG. 3, the porous $MoO_2$ synthesized according to Example 1 had nanoscale pores, and, from the above-mentioned calculation method, the pores had a specific surface area of 102 $m^2/g$, and the pores had a total volume of 0.51 cc/g. A specific surface area and a total volume of pores were calculated with respect to the anode active materials prepared in Examples 1 through 7, and the results are shown in Table 1.

Evaluation Example 3

Transmission Electro Microscopic (TEM) Test

The anode active material in particle form prepared according to Example 1 was observed by transmission electro microscopy. The results are shown in FIGS. 4A through 4D. As shown in FIGS. 4A through 4D, the porous $MoO_2$ synthesized in Example 1 included nanoscale pores that were arranged in a regular pattern and were interconnected to form channels. The nanoscale pores had a diameter of about 5 to about 7 nm.

The anode active materials prepared in Examples 2 through 7 also had nanoscale pores arranged in a regular pattern and interconnected to form channels. The pore diameters and the wall thicknesses of the frameworks, formed by the walls of the nanoscale pores, of the anode active material prepared in Examples 1 through 7, are shown in Table 1.

TABLE 1

| | Pore diameter [nm] | Wall thickness of framework [nm] | Specific surface area [$m^2/g$] | Total volume of pores [cc/g] |
|---|---|---|---|---|
| Example 1 | 5~7 | 5~10 | 102 | 0.51 |
| Example 2 | 5~7 | 5~10 | 102 | 0.51 |
| Example 3 | 5~7 | 5~10 | 102 | 0.51 |
| Example 4 | 5~7 | 5~10 | 102 | 0.51 |
| Example 5 | 5~7 | 5~10 | 102 | 0.51 |
| Example 6 | 5~7 | 5~10 | 102 | 0.51 |
| Example 7 | 3~7 | 5~7 | 220 | 0.41 |

Evaluation Example 4

Charge-Discharge Test

Figure 5:
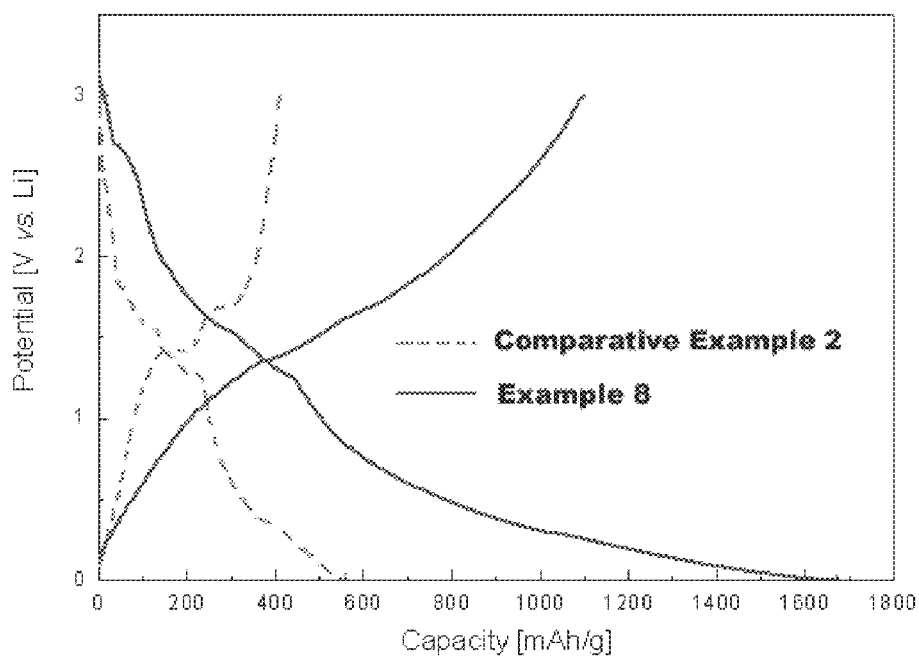
FIG. 5 is a graph showing the results of a charge-discharge test on lithium batteries manufactured according to Example 8 and Comparative Example 2.

The lithium batteries manufactured according to Examples 8 through 14 and Comparative Example 2 were charged until the voltage thereof reached 0.001 V (with respect to Li), by flowing a current of 40 mA per 1 g of the anode active material, and then discharged at the same rate, until the voltage reached 3 V (with respect to Li). Then, the charge/discharge cycle was repeated 50 times. The results from the first charge/discharge cycle are shown in FIG. 5 and Table 2. A capacity retention ratio is defined by Equation 1 below. The capacity retention ratios of the lithium batteries of Examples 8 through 14 and Comparative Example 2 are shown in Table 2.

Capacity retention ratio(%)=Discharge capacity at $50^{th}$ charge/discharge cycle÷Discharge capacity at $2^{nd}$ charge/discharge cycle   Equation 1

Evaluation Example 5

Adhesiveness Measurement

The adhesiveness of each of the anode active materials, according to Examples 8 and 14 and Comparative Example 2, to the current collector was measured according to the following criteria.

Δ: 10% or greater of a total area of the anode active material layer is separated from the current collector after the anode was formed.

○: 10% or less of a total area of the anode active material layer is separated from the current collector after the anode was formed.

⊚: No anode active material layer is separated from the current collector after the anode is formed.

The results of the adhesiveness measurement on the anode active materials according to Examples 8 through 14 are shown in Table 2 below.

TABLE 2

| | Temperature of additional thermal treatment [° C.] | Discharge capacity at $1^{st}$ cycle [mAh/g] | Capacity retention ratio [%] | Adhesiveness |
|---|---|---|---|---|
| Example 8 | No additional thermal treatment | 1181.96 | 83 | Δ |
| Example 9 | 100° C. | 1061.17 | 86 | Δ |
| Example 10 | 200° C. | 1142.54 | 95 | ○ |
| Example 11 | 300° C. | 1201.67 | 99 | ⊚ |
| Example 12 | 400° C. | 1125.79 | 95 | ⊚ |
| Example 13 | 500° C. | 1126.42 | 96 | ⊚ |
| Example 14 | No additional thermal treatment | 334 | 30 | ○ |
| Comparative Example 2 | No additional thermal treatment | 410 | 50 | ⊚ |

As shown in Table 2, the lithium battery according to Comparative Example 2 had a discharge capacity of 410 mAh/g at 3 V, whereas the lithium battery according to Example 8 had a discharge capacity of 1181 mAh/g at 3 V. The discharge capacity of the lithium battery according to Example 8 was almost 2.75 times as large as the discharge capacity of the lithium battery according to Comparative Example 2. In other words, the lithium storage capacity of the lithium battery according to Example 8 was almost 2.75 times as large as that of Comparative Example 2.

The lithium batteries according to Example 9 through 13, which were manufactured using the anode active materials that were additionally thermally treated in a hydrogen atmosphere after the removal of the $SiO_2$ template, had higher discharge capacities than the anode active material according to Example 2, like the lithium battery according to Example 8.

In addition, as shown in Table 2, the lithium batteries according to Examples 10 through 13, which were manufactured using the additionally thermally-treated anode active materials, had improved anode adhesiveness. This is attributed to the removal of impurities, such as oxygen and hydroxyl groups, present in the walls of the pores of the anode active material, through the additional thermal treatment. The adhesiveness of the slurry used to form the electrode is improved as the impurities are removed. The improved adhesiveness also improves capacitance and capacity retention ratio. Thus, the additional thermal treatment improves the performance and manufacturing efficiency of batteries.

As described above, a lithium battery according to one or more of the above exemplary embodiments include a porous transition metal oxide as an anode active material, and thus, has a higher electrical capacity than conventional batteries.

Although a few exemplary embodiments of the present teachings have been shown and described, it would be appreciated by those skilled in the art that changes may be made in this embodiment without departing from the principles and spirit of the present teachings, the scope of which is defined in the claims and their equivalents.

What is claimed is:

1. An anode active material comprising porous transition metal oxide particles having gyroid structure, wherein the porous transition metal oxide comprises an oxide of at least one transition metal selected from the group consisting of molybdenum (Mo), and vanadium (V).

2. The anode active material of claim 1, wherein pores of the porous transition metal oxide have a diameter of from about 3 nm to about 75 nm.

3. The anode active material of claim 1, wherein pores of the porous transition metal oxide have a diameter of from about 5 nm to about 7 nm.

4. The anode active material of claim 1, wherein pores of the porous transition metal oxide have a diameter of from about 3 nm to about 7 nm, and a framework formed by walls of the pores of the porous transition metal oxide has a wall thickness of from about 5 nm to about 10 nm.

5. The anode active material of claim 1, wherein the porous transition metal oxide has a specific surface area of from about 102 m$^2$/g to about 220 m$^2$/g.

6. The anode active material of claim 1, wherein the porous transition metal oxide is represented by Formula 1:

$$M_xO_y, \qquad \text{<Formula 1>}$$

wherein M is selected from the group consisting of molybdenum (Mo) vanadium (V), and a mixture thereof, $1 \leq x \leq 2$, $1 \leq y \leq 8$, and $2 \leq x+y \leq 10$.

7. The anode active material of claim 1, wherein the porous transition metal oxide comprises MoO$_2$.

8. An anode comprising the anode active material of claim 1.

9. An anode comprising the anode active material of claim 2.

10. An anode comprising the anode active material of claim 4.

11. An anode comprising the anode active material of claim 5.

12. An anode comprising the anode active material of claim 6.

13. A lithium battery including the anode of claim 8.

14. The lithium battery of claim 13, wherein the lithium battery has a discharge capacity of at least about 1000 mAh/g of the anode active material.

15. A method of preparing an anode active material comprising porous transition metal oxide particles having gyroid structure, wherein the porous transition metal oxide comprises an oxide of at least one transition metal selected from the group consisting of molybdenum (Mo), and vanadium (V), the method comprising:

impregnating a porous compound with a solution comprising a transition metal salt to provide an impregnated porous compound;

calcinating the impregnated porous compound in a first reducing atmosphere to provide a calcined product; and etching the calcinated product using an etching solution to provide an etched product.

16. The method of claim 15, wherein the porous compound is silica (SiO$_2$).

17. The method of claim 15, wherein the calcinating of the impregnated porous compound is performed at a temperature of from about 500° C.

18. The method of claim 15, wherein the etching solution is a hydrofluoric acid (HF) solution.

19. The method of claim 15,
wherein the first reducing atmosphere comprises hydrogen.

20. The method of claim 15, further comprising thermally treating the etched product in a second reducing atmosphere, after the etching of the calcinated product.

21. The method of claim 20, wherein the thermally treating of the etched product is performed at a temperature of from about 100° C. to about 500° C.

22. The method of claim 20,
wherein the second reducing atmosphere comprises hydrogen.

23. An anode active material comprising porous transition metal oxide particles having gyroid structure represented by Formula 1:

$$M_xO_y, \qquad \text{<Formula 1>}$$

wherein,
M is selected from the group consisting of molybdenum (Mo), vanadium (V), and a mixture thereof, $1 \leq x \leq 2$, $1 \leq y \leq 8$, and $2 \leq x+y \leq 10$, and pores of the transition metal oxide are disposed in a matrix and extend in parallel to one another.

* * * * *